Aug. 12, 1947.　　　R. RYAN　　　2,425,645

METHOD OF FABRICATING A TEE

Filed May 18, 1944

INVENTOR.
Robert Ryan
BY Morsell & Morsell
ATTORNEYS.

Patented Aug. 12, 1947

2,425,645

UNITED STATES PATENT OFFICE 2,425,645

METHOD OF FABRICATING A T

Robert Ryan, East Troy, Wis., assignor to Tri-Clover Machine Company, Kenosha, Wis., a corporation of Wisconsin Application May 18, 1944, Serial No. 536,113

4 Claims. (Cl. 29—157)

This invention relates to improvements in method of fabricating a T.

T's are commonly used in piping systems and in conduits for the purpose of making connections with branch lines which are at right angles to the main conduits. Heretofore it has been common practice to form these T's by a casting process, and this is a relatively expensive method.

It is a general object of the present invention to provide an improved method of fabricating a T which eliminates the necessity of using a casting process, and which substantially reduces the cost of manufacture.

A further object of the invention is to provide a method, as above described, which permits the manufacture of T's from scraps of sheet metal, and from scrap ends of tubing. The saving of material which results is particularly important in connection with T's formed of a relatively expensive metal such as stainless steel.

A further object of the invention is to provide a method of fabricating a T wherein the steps include relatively simple punching, forming and securing operations, the latter being preferably in the form of welding, with the welded joints so located that they can be readily polished to a required smoothness at a desired stage in the manufacture.

A more specific object of the invention is to provide a method of manufacturing a T which includes the steps of punching a hole of desired diameter in a flat sheet of metal, securing the end of a short piece of tubing within the marginal edge of said hole to provide a neck, curling the flat sheet into cylindrical form with the neck projecting exteriorly therefrom, and securing together the meeting edges of the curled sheet.

A further specific object of the invention is to provide a method, as above described, wherein the lower end of the short piece of tubing is preferably flared, with the flared portion extending at substantially right angles and trimmed to the diameter of the punched hole in the flared sheet, the edges of the flared portion being secured to the marginal edge of the hole. This securing step is preferably accomplished by a welding operation, and due to the fact that the sheet is still flat with the weld laterally removed from the upright portion of the tubing, the polishing of the weld before the sheet is curled is a relatively simple operation.

With the above and other objects in view the invention consists of the improved method of fabricating a T and all its parts and combinations as set forth in the claims and all equivalents thereof. In the accompanying drawing illustrating the steps which take place in preferred embodiments of the method in which the same reference numerals designate the same parts in all of the views:

Figure 1:
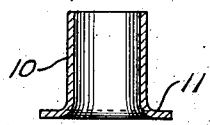
Fig. 1 is a vertical sectional view taken through a piece of scrap tubing after the lower end has been flared.

Referring more particularly to the drawing and first to Figs. 1 to 5 inclusive, a piece of scrap metal tubing 10 of desired length is flared at right angles, as at 11, to provide an annular flange surrounding the bottom of the tube. Next a flat sheet of metal 12, which has been trimmed to a predetermined dimension, has a hole 13 punched therein. This hole is of a diameter to snugly receive the flange 11 of the piece of tubing 10. The tube is then inserted in position in the hole, while the sheet 12 is flat, and the edge of the flange 11 of the tubing is welded to the marginal edge of the hole 13 as at 14. While the sheet 12 is still in flat condition the line of welding 14 can be easily polished off to a desired smoothness. By reason of the flared flange 11 the weld line 14 is spaced from the upright portion of the tube or neck 10. This facilitates both the welding and polishing operations.

Figure 3:
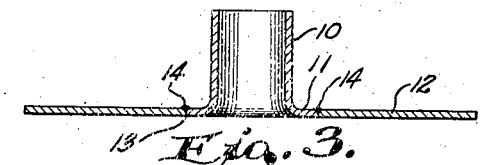
Fig. 3 is a sectional view taken on the line 3—3 of Fig. 2 after the flared tubing of Fig. 1 has been welded in position in the hole of the flat sheet.
Figure 4:
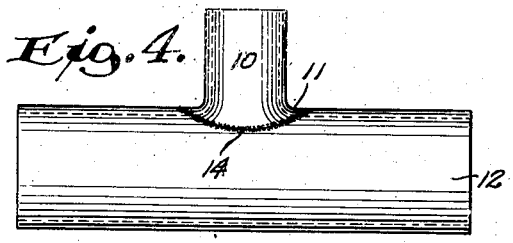
Fig. 4 is a side view of the finished T after the flat sheet has been formed to cylindrical shape.

After the neck 10 has been welded to the flat sheet the article of Fig. 3 is placed in a forming die for the purpose of curling up the sheet 12 to the cylindrical form of Fig. 4. When in this condition the opposite longitudinal edges 15 and 16 of the sheet 12 are juxtaposed. Next, the article of Fig. 4 is placed in a holder and a straight weld 17 is made along the back of the T to secure the meeting edges 15 and 16 together.

Figure 6:
Fig. 6 is a view illustrating the first step of a slightly alternative method and showing a short piece of scrap tubing in vertical section.
Figure 2:
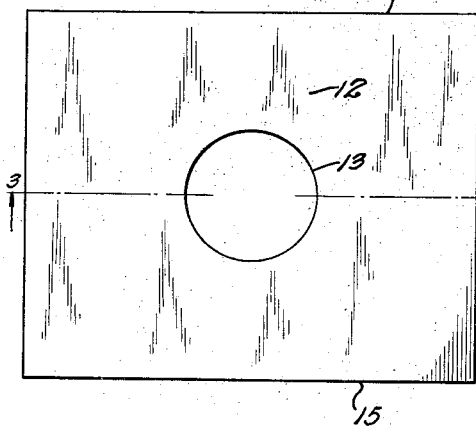
Fig. 2 is a plan view of a flat sheet of metal after a hole of required diameter has been punched therein.
Figure 7:
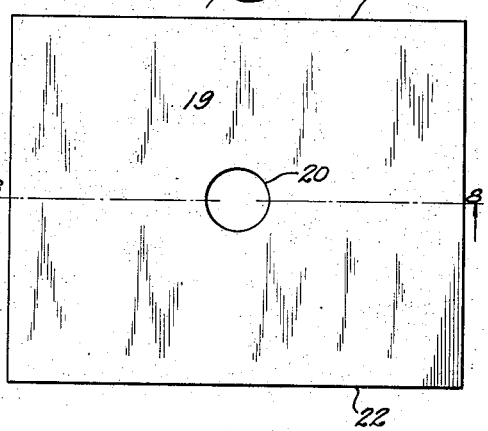
Fig. 7 is a plan view of a flat sheet of metal after a hole of required diameter has been punched therein.
Figure 8:
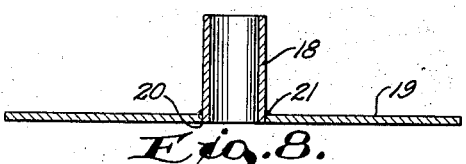
Fig. 8 is a sectional view taken on the line 8—8 of Fig. 7 after the tubing of Fig. 6 has been welded in position in the hole of the flat sheet.

While it is very advantageous to utilize the flare 11 on the neck 10, nevertheless a similar method may be carried out without flaring the lower edge of the piece of short tubing. Referring to Figs. 6 to 8 inclusive, a short piece of scrap tubing 18 is cut to desired length. Next, a flat sheet of metal 19, which has been trimmed to a predetermined dimension, has a hole 20 punched therein. The hole is of proper diameter to snugly receive the lower end of the piece of tubing 18. The piece of tubing is then inserted in the hole 20, as illustrated in Fig. 8, and the tubing is welded in position by a circular line of welding, as at 21.

Figure 9:
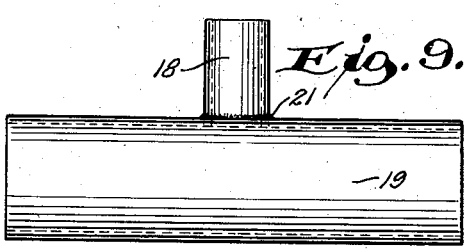
Fig. 9 is a side elevational view of the completed T.
Figure 5:
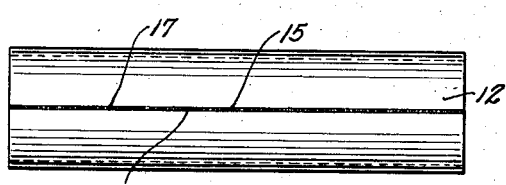
Fig. 5 is a bottom view of the T of Fig. 4 to show the line of welding connecting the meeting edges of the sheet.

Following this operation the flat sheet 19 is placed in a forming die and curled to the cylindrical form of Fig. 9. The meeting edges 22 and 23 of the flat sheet are then welded together by a straight weld, the same as is illustrated in Fig. 5.

The above methods are particularly advantageous when it is desired to form T's from a relatively expensive metal, such as stainless steel, because the method makes it entirely practical to utilize scraps. Furthermore, in the form of the invention shown in Figs. 1 to 5, the polishing of the weld 14 down to a required smoothness may be very easily and inexpensively accomplished. A smooth polishing operation is essential where the T's are designed for use in pasteurizing equipment or other installations where sanitation is a factor.

While welding is the preferred method of connecting the neck to the flat sheet and of securing the meeting edges of the curled sheet together, nevertheless for certain types of uses other securing methods may be employed. Various other changes and modifications in the method may be made without departing from the spirit of the invention, and all of such changes are contemplated as may come within the scope of the claims.

What I claim is:

1. A method of fabricating a T comprising punching a hole in a flat rectangular sheet of metal, welding the lower end of a piece of tubing in said hole, while the sheet is substantially flat and while the tubing is so held that it does not project beyond the bottom surface of the sheet, thereafter forming the sheet into cylindrical shape with the tubing projecting exteriorly therefrom and with opposite edges of the sheet substantially juxtaposed, and securing said edges of the sheet together.

2. A method of fabricating a T comprising flaring the lower edge of a piece of tubing, punching a hole in a sheet of metal with the hole of a diameter to snugly receive the flared lower end of the tubing, welding the edge of said flared portion to the marginal edge of said hole by a line of welding extending around the tube while the marginal portion of the flare is substantially in the plane of the sheet, thereafter forming the sheet into cylindrical shape with the tubing projecting exteriorly therefrom and with opposite edges of the sheet juxtaposed, and securing said edges of the sheet together.

3. A method of fabricating a T comprising flaring the lower edge of a piece of tubing, punching a hole in a flat rectangular sheet of metal with the hole of a diameter to snugly receive the flared lower end of the tubing, welding the edge of said flared portion to the marginal edge of said hole, polishing off the weld while the sheet is still flat, thereafter forming the sheet into cylindrical shape with the tubing projecting exteriorly therefrom and with opposite edges of the sheet substantially juxtaposed, and welding said edges of the sheet together.

4. A method of fabricating a T comprising punching a hole in a flat sheet of metal, welding the lower end of a piece of tubing in said hole while the sheet is substantially flat, thereafter forming the sheet into cylindrical shape with the tubing projecting exteriorly therefrom and with opposite edges of the sheet substantially juxtaposed, and securing said edges of the sheet together.

ROBERT RYAN.

REFERENCES CITED

The following references are of record in the file of this patent:

UNITED STATES PATENTS

| Number | Name | Date |
|---|---|---|
| 1,437,937 | Gray | Dec. 5, 1922 |
| 1,165,316 | Carlson | Dec. 21, 1915 |

FOREIGN PATENTS

| Number | Country | Date |
|---|---|---|
| 27,891 | Australia | July 18, 1930 |
| 21,616 | Great Britain | Oct. 8, 1903 |